March 5, 1957 G. F. RACKETT 2,784,248
LIGHTING SYSTEM IN TAKING MOVING PICTURES
AND IN TELEVISION SYSTEM
Filed March 3, 1950 3 Sheets-Sheet 1

INVENTOR.
Gerald F. Rackett
BY
Lyon & Lyon
ATTORNEYS.

March 5, 1957 G. F. RACKETT 2,784,248

LIGHTING SYSTEM IN TAKING MOVING PICTURES AND IN TELEVISION SYSTEM

Filed March 3, 1950 3 Sheets-Sheet 2

INVENTOR.

Gerald F. Rackett

BY Lyon & Lyon

ATTORNEYS.

Gerald F. Rackett INVENTOR.

BY Lyon & Lyon ATTORNEYS.

2,784,248

LIGHTING SYSTEM IN TAKING MOVING PICTURES AND IN TELEVISION SYSTEM

Gerald F. Rackett, North Hollywood, Calif., assignor to Columbia Pictures Corporation, Los Angeles, Calif., a corporation of New York Application March 3, 1950, Serial No. 147,501

6 Claims. (Cl. 178—7.2)

Figure 1:
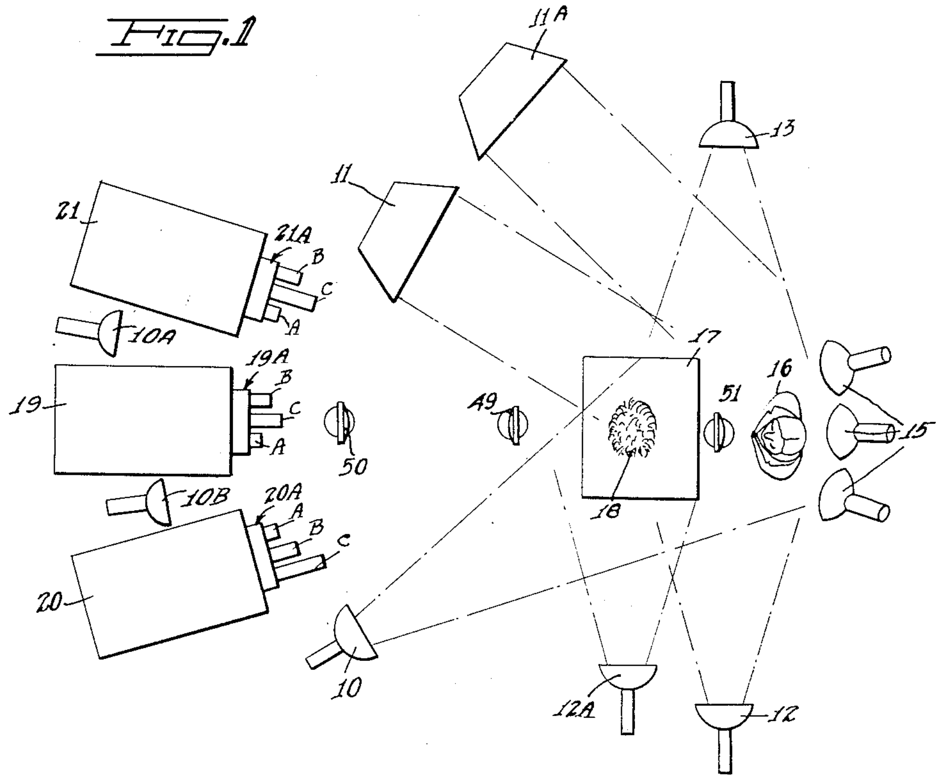

The present invention relates to an improved photographic and/or television system, and specifically to an arrangement for taking sound motion pictures or television transmission wherein the lighting of subjects being photographed or scenes being televised is automatically changed in accordance either with the focusing of a particular camera or with the selection, at a monitoring station, of a particular camera from a group of such cameras, all arranged to photograph or televise the same scene, the system being operative to simultaneously and automatically record the accompanying sound impinging on one of a plurality of corresponding microphones, each either located at different positions on the set or arranged to produce different types of sound effects.

In the present state of the motion picture art, scenes are illuminated differently in accordance with the type of "shot" taken, i. e. the type of lighting depends upon whether the shot is a "long shot," "medium shot" or "close shot." Since it is desirable to include progressively a series of the different types of shots, in the film as projected in the motion picture theatre, to provide emphasis and better characterizations, it becomes necessary, in accordance with conventional practice, to interrupt the taking of different scenes to rearrange the lighting, cameras and refocusing of the cameras.

In accordance with the present invention, an entire scene may be enacted continuously while different lighting effects are produced in accordance with the focusing of a particular camera or the selection of a particular camera. Thus, for example, when a dramatic sequence involving three persons is being photographed, one camera at a first location may be used continuously or intermittently to cover the entire field of action, i. e. such one camera being focused for a long shot; a second camera at a second or the same location may be focused so as to cover the action of one of such three persons with varying degrees of intimacy using different focal length lenses to produce what may be termed medium and close shots; and, the third camera at a third location or the same location may be used to cover the interchange of dialogue between two of such persons with varying degrees of intimacy, using for that purpose lenses of the desired focal length to produce what might be termed "two shots" or "tight two shots."

In accordance with the present invention, the type of lighting is changed with the focusing of the particular camera. The proper lighting required for a long shot is substantially different from the proper lighting required for a medium shot or closeup. Consequently, for the best photography of long shots, medium shots and closeups, not only must the effective position of the camera be changed but also the type of lighting should be changed simultaneously.

It is therefore an object of the present invention to provide an improved system for taking motion pictures in which the type of lighting is varied automatically in accordance with the focused condition of a particular camera to allow the completion of an entire dramatic sequence without interruption.

Another object of the present invention is to provide an improved system for taking motion pictures with the feature mentioned in the preceding paragraph which allows selection by a director at a central monitoring station of a particular camera and related type of lighting.

Another object of the present invention is to provide an improved system for taking motion pictures in which different types of lights in a studio may be energized automatically in accordance with the selection of a particular one of a plurality of cameras, each focused differently, to present corresponding different fields of vision.

Another object of the present invention is to provide an improved system for taking motion pictures, having as one of its desirable features the object set forth in the preceding paragraph, which is characterized by an electrical switching arrangement whereby different types of lights are each simultaneously energized in the transition of adjusting the focusing arrangement of the cameras from one position to the other so as to produce a blending of the two different types of light.

Still another object of the present invention is to provide a switching arrangement associated with the lens turret of a motion picture camera which serves to connect into an electrical circuit a desired set of lights optimumly related to the type of focusing accomplished by the lens turret.

Still another object of the present invention is to provide an improved system for taking motion pictures wherein monitoring and camera selection means are provided to select and place into operation any one of a plurality of motion picture cameras, and wherein the type of lighting on the scene being photographed by a particular selected camera is automatically changed upon making such selection.

Yet another object of the present invention is to provide an improved system for taking motion pictures of the type described in the next preceding paragraph, characterized by the fact that the movable lens turret of the cameras is associated with the switching arrangement which serves to connect into an electrical circuit a desired set of lights optimumly related to the type of focusing accomplished by the lens turret.

Still another object of the present invention is to provide an improved system for taking motion pictures in which the type of illumination is automatically changed with focusing of the motion picture camera, thereby assuring the optimum type of lighting for a given focused condition of the camera.

Yet another object of the present invention is to provide an improved television system of the type described and claimed in my copending application, Serial No. 119,329, filed October 3, 1949, now United States Patent 2,702,312, patented February 15, 1955, and assigned to the same assignee as the present application, characterized by the fact that the type of accompanying sound transmission is automatically changed with focusing of the television camera.

Yet a further object of the present invention is to provide an improved motion picture system of the character mentioned herein, wherein different corresponding types of accompanying sound are automatically recorded in accordance with the particular focused condition of a camera.

Figure 2:
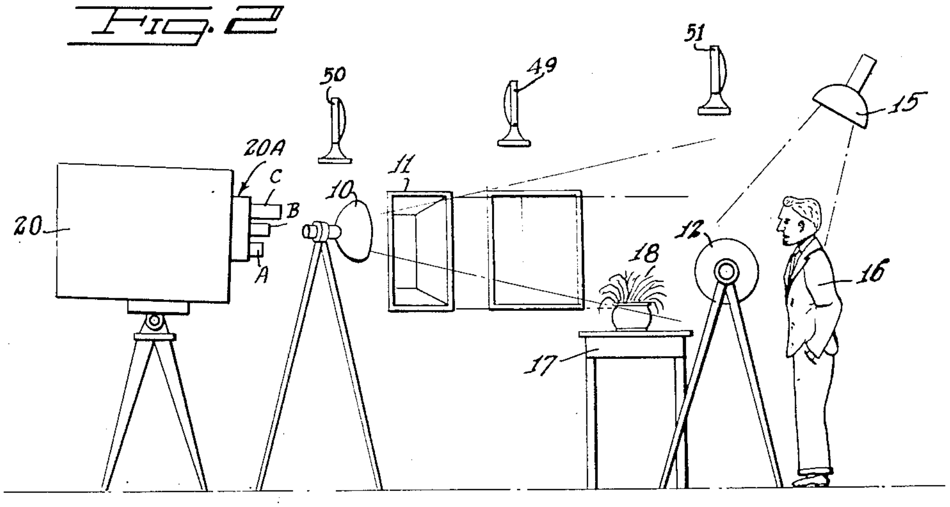
Figure 3:
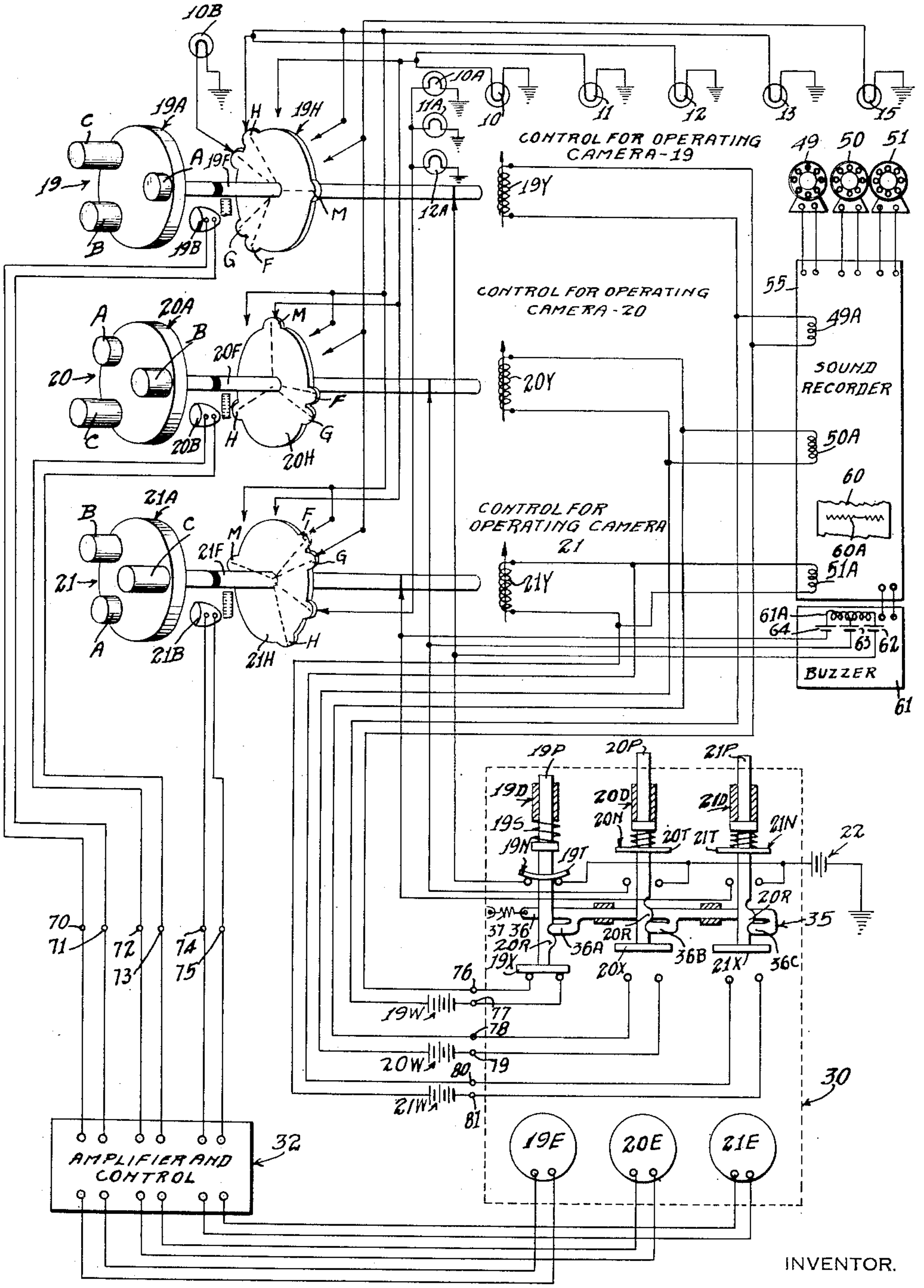
Figure 4:
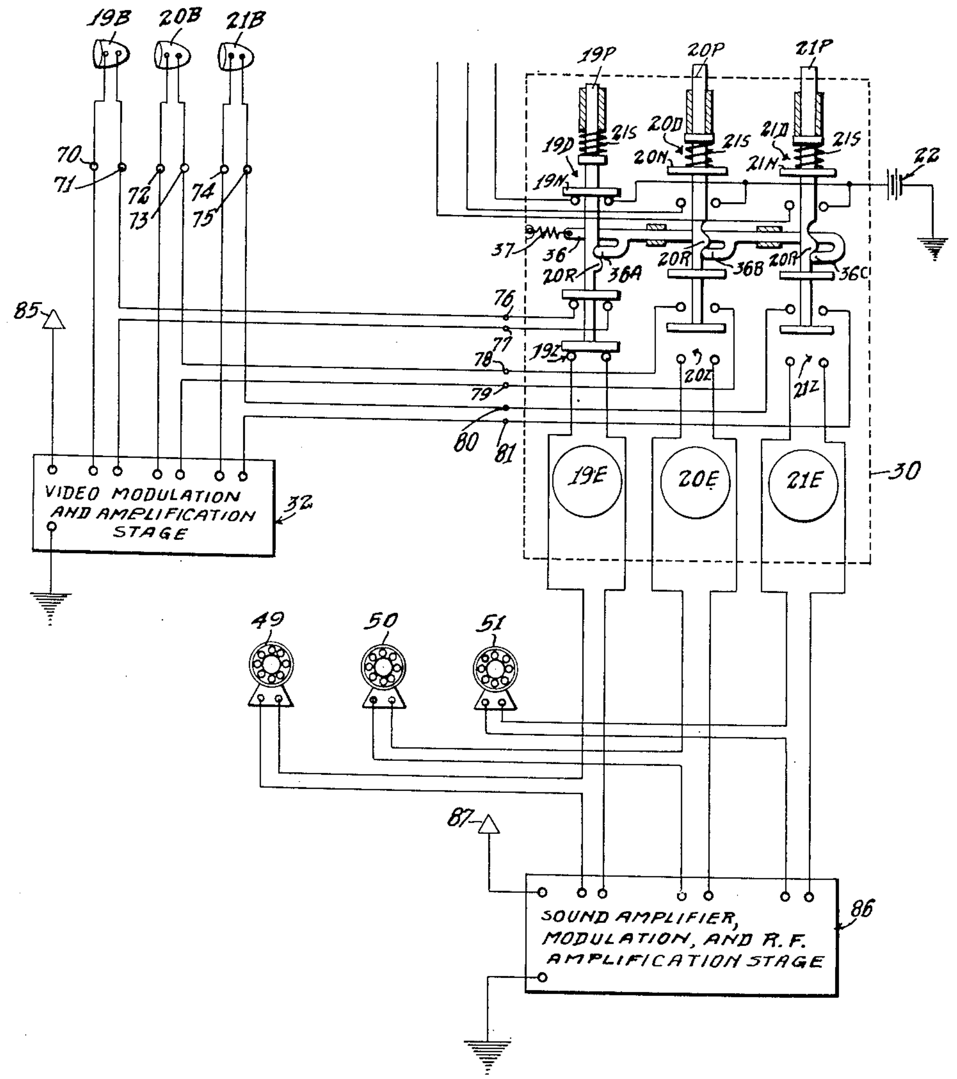

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a top plan view of apparatus in a motion picture studio connected, as more specifically shown in the later figures, for achieving the objects of the present invention, it being noted that the cameras 19, 20, 21 may be placed further from the subject 16 than is indicated in this figure, Figure 2 is a view in side elevation of a portion of the apparatus shown in Figure 1, Figure 3 shows the manner in which the apparatus shown in the previous figures is connected in an electrical circuit in accordance with features of the present invention, and Figure 4 shows a circuit arrangement intended to be substituted for corresponding circuit components shown in Figure 3 for converting the motion picture system shown in Figure 3 into a television system.

Generally there are four types of lighting arrangements used in photographing various scenes effectively. These four types of light may be classified generally as follows: (1) key lighting; (2) back lighting; (3) fill lighting, and (4) cross lighting.

Oftentimes, in photographic practice, it is desirable to use one or more of such four different lighting arrangements in combination. These four different types of lighting may be produced by the apparatus shown in Figure 1, wherein the light source 10 throws a shaft of light in the form of a key light, the light source 11 throws a light which may be termed a "fill" light, the light sources 12, 13 throw beams of light in opposite directions one towards the other, which may be termed "cross" lights, and the light sources 15 throw beams of light which may be termed "back" lights.

The key light 10 generally provides the principal overall lighting and is used in taking long shots. The fill light 11 is intended to supply light to those regions of the subject being photographed which otherwise might be in a shadow, and generally the fill light 11 is a diffused light for raising the degree of illumination of portions of the subject otherwise in a shadow. In general, the cross lights 12, 13 are usually used one at a time to produce shadows, while the back lights 15 are used to produce relief effects.

The combination of lights 10, 11, 12, 13 and 15, arranged with respect to the person 16 being photographed and the table 17 with the ornament 18 thereon and the motion picture cameras 19, 20, 21, are positioned for automatically producing any one of the four different types of lighting enumerated above, or a mixture of any one of such four types of lighting in accordance with the positioning of the lens turrets 19A, 20A, 21A of cameras 19, 20, 21, respectively.

These groups of different lights 10, 11, 12, 13 and 15, are, of course, of the electrical type, either the incandescent filament type or arc light type with movable light opaque diaphragms, and are connected in an electrical circuit as shown, for example, in Figure 3, to produce a combination optimum lighting effect for the three types of shots mentioned hereinabove, namely, a long shot, medium shot and close shot.

The cameras 19, 20, 21 each have three lenses A, B, C, fixedly mounted on their corresponding rotatable turrets 19A, 20A, 21A for focusing the respective cameras respectively for the aforementioned close shots, medium shots and long shots, it being noted, as explained in more detail hereinafter, that the lens sets A, B, C each comprise, in fact, two lenses, one for focusing of an image onto a motion picture film, and a second lens for focusing the same scene onto an associated iconoscope or television picture tube.

In Figure 3, thus, the camera 21 is focused to project through its set of lenses A close shots onto the motion picture film and associated iconoscope 21B; the camera 19 is focused to project through its lens system B medium shots onto the motion picture film and associated iconoscope 19B; and, the camera 20 is focused to project through its lens system C long shots onto the motion picture film and the associated iconoscope 20B.

In order to achieve the desirable results indicated above, the type of lighting should correspond to the type of shot being photographed or televised. For example, when long shots are being photographed or televised, it may be desirable to energize only the key light 10 and fill light 11; when close shots are being photographed or televised, it may be desirable to energize a whole new series of lights; and when medium shots are being photographed or televised, an entirely new series of lights may be energized, or the lights energized may comprise a combination of previously used lights with or without additional lights.

It is evident that many different lighting schemes may be devised, using the general principles described herein, depending upon the type of scene which is desired to be photographed or televised. For that reason it is clear that the specific example given herein is merely representative and exemplary of those which may be used, and is not intended to limit the scope of the present invention in any respect.

In the specific example shown in the drawings, when long shots are being photographed or televised only the key light 10 and fill light 11 are energized; when close shots are photographed or televised the fill light 11A, cross light 12A, key light 10A, back lights 15 and cross lights 12, 13 are energized; and when medium shots are being photographed or televised only the cross lights 12, 13 and key light 10B may be energized.

The electrical circuit for producing this result is shown in Figure 3. In Figure 3 the lens turrets 19A, 20A and 21A may each be rotated to any one of its three positions to produce any one of the three types of shots, namely, long, close and medium shots.

In accordance with the present invention, any one of the plurality of cameras 19, 20 and 21 is selected and placed in operation to photograph the corresponding different type of shots. One of the cameras is set, as is the camera 21, for the production of a close shot, a second camera such as the camera 19 is conditioned for the production of medium shots, and a third camera such as the camera 20 may be conditioned for the production of long shots; and, in order to effect a change in the type of shot being photographed, a particular one of the cameras is selected and placed into operation by switches disposed at, for example, the monitoring station 30.

Each one of the cameras 19, 20, 21 has incorporated therein a corresponding iconoscope 19B, 20B, 21B. The outputs of each of the iconoscopes 19B, 20B and 21B, after suitable amplification are applied to corresponding cathode ray tubes 19E, 20E and 21E.

At such monitoring station 30 cathode ray tube 19E reproduces the medium shot developed by camera 19; cathode ray tube 20E reproduces the long shot image developed by camera 20; and, tube 21E reproduces the close shot image developed by camera 21. A person at such monitoring station 30 may switch in any one of such cameras 19, 20, 21 by actuation of the corresponding push button switches 19D, 20D or 21D, as he may desire. The particular circuit arrangement for accomplishing this is described hereinafter.

Each one of the camera turrets 19A, 20A and 21A has mechanically coupled thereto, through a corresponding electrically insulated shaft 19F, 20F, 21F, an insulated corresponding wafer 19H, 20H, 21H. Each one of such insulated wafers has mounted on the periphery thereof metallic contact members F, G, H and M, each one of such contact members being connected as indicated by the dotted lines to their corresponding insulated shafts 19F, 20F and 21F, and being movable with such corresponding shafts into engagement with stationary contacts (indicated by the arrows), which are connected in a predetermined pattern with terminals of the lights 10, 11, 12, 13 and 15 for producing the results indicated above.

These metallic contacts F, G, H and M are so disposed on the periphery of their corresponding wafers 19H, 20H and 21H, that when the corresponding camera is adjusted for close shots (as is the camera 21) the contacts F, G serve to connect the left-hand terminals (Figure 3) of the cross lights 12, 13 and back lights 15 to one terminal of the corresponding switch 21N; that when the camera is adjusted for medium shots (as is the camera 19) the contact H connects the left-hand terminals of the cross lights 12, 13 to one terminal of the corresponding switch 19N; and, that when the associated camera is adjusted for long shots (as is the camera 20) the contact M connects the left-hand terminals of the key light 10 and fill light 11 to one terminal of the corresponding switch 20N.

It is noted that the right-hand terminals of each one of the lights 10, 11, 12, 13 and 15 is grounded and that the other terminals of such previously mentioned switches 19N, 20N and 21N are each connected to the ungrounded terminal of voltage source 22, so that actuation of any one of the switches 19N, 20N or 21N, at the desire of the producer, results in energization of a group of the lights 10, 11, 12, 13 and 15, depending upon the originally pre-set condition of the turrets 19A, 20A or 21A.

More specifically, when the switch 19D is moved to its actuated position shown in Figure 3, the cross lights 12, 13 only are illuminated with the related camera 19 focused for taking medium shots. Upon actuation of the switch 20D, the related switch 20N is closed and the originally closed switch 19N is opened (by means described later), to thereby produce energization of the key light 10 and fill light 11. And when the switch 21D is actuated the cross lights 12, 13 and back light 15 are energized.

In other words, as is evident from the description hereinabove, the switch 19N is serially connected with the switches actuated upon rotation of the insulated shaft 19F; the switch 20N is serially connected with the switches actuated upon rotation of shaft 20F; and the switch 21N is serially connected with the switches actuated upon rotation of the shaft 21F. Further, it is evident that any group of ungrounded terminals of the light sources 10, 11, 12, 13 and 15, as desired, may be connected to such switches which are actuated respectively upon rotation of shafts 19F, 20F and 21F, to produce correspondingly different lighting effects depending upon the position of the respective lens turrets 19A, 20A and 21A. It is observed also that only one of such combination of lights may be energized continuously, depending upon which one of switches 19N, 20N or 21N is closed.

These switches 19N, 20N and 21N are part of push button assemblies 19D, 20D and 21D respectively, only one of which may be held in a latched or closed position by the latching mechanism 35, including the spring biased latching bar 36. This latching bar 36 is normally biased to the left in Figure 3 by the coil tension spring 37 with abutments 36A, 36B and 36C thereof contacting the reciprocal push button switching bars 19P, 20P and 21P. Such bars 19P, 20P and 21P each have a reentrant portion adjacent a cam portion as shown in Figure 3. As shown in Figure 3, the abutment 36A engages the reentrant portion of bar 19P to maintain the switch 19D in its actuated or closed position. If it is desired to actuate switch 20D the bar 20P is depressed so as to bring the cammed projection 20R into engagement with the abutment 36B, to thereby move the abutment 36A out of engagement with the reentrant portion in the bar 19P. Continued downward movement of bar 20P results in engagement of the abutment 36B with the reentrant portion in the bar 20P, to thereby maintain such bar in its depressed or circuit closing position.

It is noted that the switches 19N, 20N and 21N are of special construction and each incorporate a corresponding bendable switch contacting member 19T, 20T and 21T. The purpose of such switch contact members 19T, 20T and 21T being to cause two of such switches 19N, 20N or 21N, as the case may be, to be simultaneously closed for a brief time interval when and as such switches 19D, 20D and 21D are actuated, to thereby produce a blending or smooth transition in lighting effects as such switches are actuated. For example, when the switch 19D is in its closed position as shown in Figure 3, the lights 12 and 13 are energized through switch 19N, which includes the deformable and resilient switch contacting member 19T; and then, upon actuation of the switch 20D, the switch 20N is closed simultaneously with the switch 19N before such switch 19N opens, whereby, for a brief instant, in the order of approximately one-tenth of a second, the lights 12, 13 are illuminated simultaneously with the lights 10 and 11 energized through switch 20N. This time interval of one-tenth of a second is determined largely by the resilient nature of the switch contact 19T which moves to its normal unstressed condition when and as the bar 19P moves upwardly under the influence of the coil compression spring 19S.

Each one of the push button switch assemblies 19D, 20D and 21D has also associated therewith a corresponding normally open switch 19X, 20X, 21X, for placing into operation the corresponding camera associated respectively with iconoscope 19B, 20B, 21B, it being noted that this switching arrangement allows only one particular camera to be operative at one particular time.

For this purpose it is noted that actuation of switch 19X results in energization of a solenoid 19Y by battery 19W; actuation of switch 20X results in energization of solenoid 20Y by battery 20W; and actuation of switch 21X results in energization of solenoid 21Y by battery 21W. Energization of solenoids 19Y, 20Y and 21Y results respectively in placing in operation cameras 19, 20 and 21 respectively. Further, as is well understood, the cathode ray tubes 19E, 20E and 21E may at all times be effective to reproduce the video output of the associated iconoscopes 19B, 20B and 21B, whereby the person at the monitoring station 30 may at a glance observe the picture being "taken" by any one of the cameras 19, 20, 21, and may select the corresponding camera by actuating switches 19D, 20D, or 21D. Upon actuation of such switches 19D, 20D, 21D, as explained in detail hereinabove, not only is a particular camera selected, but also the lighting is changed.

Thus, when the producer at station 30 selects any one of the plurality of cameras 19, 20, 21, he automatically effects a change in the type of lighting.

In accordance with other features of the present invention, different microphones for reproducing the accompanying sound may be automatically switched into the sound recording system simultaneously with the change in focused condition of the cameras. For example, there may be provided the three microphones 49, 50 and 51, each of which is rendered effective to record sound upon operation of the corresponding camera 19, 20, 21. These microphones 49, 50, 51 may be located in different positions, as indicated in Figure 1, and may be connected for the recording of sound to a sound recorder 55, as indicated in Figure 3.

It is noted that the microphone 51 is positioned relatively close to the actor shown in Figure 1, the microphone 50 is positioned relatively far from the actor, and the third microphone 49 is in a position between the microphones 50 and 51. The voltages developed in microphone 49 are utilized to record sound on the film 60 (Figure 3) in the sound recorder 55 when medium shots are being taken; the voltages developed in microphone 50 are utilized to record sound on the same film 60 when long shots are being taken; and the voltages developed in microphone 51 are utilized to record sound on the same film 60 when close shots are being taken. In other words, only one sound film strip 60 is used to record the sound voltages developed in microphones 49, 50 and 51, the microphones 49, 50 and 51 having their outputs selectively connected to the recording head associated with the film strip 60 through the control windings 49A, 50A and 51A, respectively.

In other words, when winding 49A is energized, the output of microphone 49 only is effective for the reproduction of sound on the strip 60. Similarly, when windings 50A and 51A are energized, the corresponding outputs of microphones 50 and 51 only are effective for the reproduction of sound on the strip 60. It is observed that the winding 49A is connected in parallel with the winding 19Y, the winding 50A is connected in parallel with the winding 20Y, and the winding 51A is connected in parallel with the winding 21Y, so that these windings 49A, 50A and 51A are energized simultaneously with the camera control windings 19Y, 20Y and 21Y, respectively.

It is desirable, when making sound motion pictures, to provide some identifying means on the photographic film and sound film, wire or other sound recording media whereby, after development and processing, the motion picture film may be synchronized with the sound recording tape, wire or other media used. In the present system, for this purpose, indexing means on the sound film 60 is provided by the use of a buzzer 61 connected as shown in Figure 3. The output terminals of the buzzer 61 are connected to the sound recorder 55 to produce, for example, a constant pitch sound on the recording medium simultaneously and automatically upon actuation of either one of the switches 19P, 20P or 21P. Of course, upon such switch actuation, as explained above, different cameras are selected and the lighting of the scenes is simultaneously changed.

The buzzer 61 is energized only for a brief instance, but of sufficiently long duration to produce an indexing mark on the film 60. For this purpose, the buzzer 61 is provided with a winding 61A with three terminals thereon, each of the terminals being connected to a corresponding terminal of batteries 62, 63, 64, the other terminals of such batteries being connected respectively to the shafts 19F, 20F, 21F. As described hereinabove, these shafts 19F, 20F, 21F are, in turn, connected to one terminal of the switches closed by the special contact members 19T, 20T and 21T to provide a smooth transition in lighting upon actuation of one of the switches 19P, 20P and 21P. In other words, upon actuation of the switches 19P, 20P and 21P, a pair of the shafts 19F, 20F and 21F are instantly connected together to provide a closed circuit for the flow of current from the batteries 62, 63, 64, as the case may be, and through the winding 61A. These batteries 62, 63 and 64 may each have different voltages to produce sound waves 60A of different intensities on the film 60, depending upon which one of the switches 19P, 20P, 21P is actuated.

In other words, the presence of the recording 60A produced by the buzzer 61 indicates a change in selection of cameras and associated change in lighting; while the intensity of the recording 60A serves as an indication as to the particular switch 19P, 20P or 21P which was actuated to produce such recording 60A. Thus, the presence of the recording 60A and its intensity may serve to index the sound film 60 and the motion picture film after processing and in the assembly operation.

Instead of using a buzzer 61, suitable indexing of the sound recording and photographic film may be provided by other means such as, for example, by simultaneously photographing and recording a hand-clap. While the system shown in Figure 3 uses, for purposes of economy, a single sound film or strip 60 to record the sound voltages developed in each one of the microphones 49, 50, 51, is is readily apparent, to those skilled in the art, that a separate sound film 60 may be associated with each one of the microphones 49, 50, 51, so that the recording on each of such film strips is the result of sound voltages developed only on the corresponding microphone.

The apparatus shown in Figure 4 has its designated terminals 70, 71, 72, 73, 74, 75, 76, 77, 78, 79, 80 and 81 connected to identically numbered terminals in Figure 3 to accomplish television transmission.

A distinguishing feature of the present television system described herein is that the output of one of the microphones 49, 50 or 51 is used to modulate a sound television transmitter, the particular microphone chosen being dependent upon which one of the switches 19E, 20E, 21E is actuated.

In the arrangement shown in Figure 4, the terminals 70, 71, 72, 73, 74 and 75, pairs of which are connected respectively to iconoscopes 19B, 20B, 21B, are used in the production of a transmitted television video signal radiated from the antenna system 85. Each one of the push button assemblies 19D, 20D and 21D have their corresponding normally open switch 19X, 20X, 21X arranged to connect the video output of the corresponding iconoscopes 19B, 20B, 21B to the modulator stage in the television transmitter 32, it being noted that this switching arrangement allows the transfer of the video from only one of the tubes 19B, 20B, 21B to such modulator stage within the transmitter 32. Further, as is well understood, the cathode ray tubes 19E, 20E, 21E may at all times be effective to reproduce the video output of the associated iconoscope 19B, 20B, 21B, whereby the person at the monitoring stage 30 may at a glance observe the picture being "taken" by any one of the iconoscopes 19B, 20B and 21B, and may select the video output of any one of such iconoscopes by actuating switches 19D, 20D or 21D for transmission by the television video transmitter 32. Upon actuation of such switches 19D, 20D, 21D, as explained in detail hereinabove, not only is a particular video output selected, but also the lighting is changed and further the output of a particular microphone is selected.

For the purpose of selecting the output of a particular microphone 49, 50, 51, arranged as shown in Figures 1 and 2 in relation to the actor 16, the switches 19D, 20D, 21D are each provided with an additional normally open switch 19Z, 20Z, 21Z, which serve respectively to connect the output of the microphone 49, 50, 51 to the modulator stage of the combined sound amplifier modulator and radio frequency amplifier stage 86, the output of which in turn is radiated by the antenna system 87.

Thus, when the producer at station 30 selects the video output of any one of the plurality of television camera tubes 19B, 20B, 21B, he automatically effects a change in the type of lighting, and automatically selects for transmission the output of the corresponding microphone 49, 50, 51.

While the particular embodiments of the present invention have been shown and described, it will be obvious to those skilled in the art that changes and modification may be made without departing from this invention in its broader aspects and, therefore, the aim in the appended claims is to cover all such changes and modifications as fall within the true spirit and scope of this invention.

I claim:

1. In a system of the character described, a plurality of lights each arranged to produce a different lighting effect on scenes being televised, a plurality of cameras each having a lens system adjustably mounted thereon to adjust the focusing of the corresponding camera, a first plurality of non-sequential selecting switches at a monitoring station, any one of which may, at any one particular time, be selected and operated, each of said switches corresponding to a different camera, a second plurality of switches actuated upon adjustment of said lens system, each one of said second plurality of switches corresponding to a different lighting effect, a serial electrical circuit connected to a source of voltage for said lights comprising said lights and said first and said second plurality of switches, sound utilization means, a plurality of sound sources, each corresponding to a corresponding camera, and means operated by a corresponding one of said first plurality of non-sequential selecting switches for connecting a corresponding one of said sound sources to said sound utilization means.

2. In a television system of the character described, a plurality of television cameras each focused differently, a plurality of lights each in different position and arranged to produce a different lighting effect on scenes being televised, a television transmitter, selective non-sequentially operated switching means connecting the video output of a selected one of said television cameras to said transmitter to modulate the same in accordance therewith, means operated upon operation of said selective switching means to energize different ones of said plurality of lights corresponding to the video output of the camera selected, sound utilization means, a plurality of sound sources, each corresponding to a corresponding camera, and means operated by said selective non-sequentially operated switching means to connect different ones of said sound sources to said utilization means, said utilization means comprising a modulator stage of said transmitter.

3. In a motion picture system of the character described, a plurality of motion picture cameras each focused differently, a plurality of lights each arranged to produce a different lighting effect on scenes being photographed, selective switching means for operating a selected one of said cameras, and means operated upon operation of said selective switching means to energize different ones to said plurality of lights corresponding to the camera selected, said means to energize different ones of said lights serving to momentarily and simultaneously energize a plurality of different ones of said lights to effect a smooth transition in lighting when said selective switching means is operated.

4. In a television system of the character described, a plurality of lights each arranged to produce a different lighting effect on scenes being televised, a plurality of television cameras each having a lens system adjustably mounted thereon to adjust the focusing of a corresponding camera, a first plurality of switches, each of said switches corresponding to a different camera, a second plurality of switches actuated upon adjustment of said lens system, each one of said second plurality of switches corresponding to a different lighting effect, a serial electrical circuit connected to a source of voltage for said lights comprising said lights and said first and said second plurality of switches, a television transmitter, selective non-sequentially operated switching means connecting the video output of a selected one of said television cameras to said transmitter to modulate the same in accordance therewith, said first plurality of switches being actuated upon actuation of said selective switching means and serving to momentarily and simultaneously energize a plurality of different ones of said lights to effect a smooth transition in lighting when said selective switching means is operated, sound utilization means, a plurality of sound sources, each corresponding to a corresponding camera, and means operated by said selective non-sequentially operated switching means to connect different ones of said sound sources to said utilization means, said utilization means comprising a modulator stage of said transmitter.

5. In a television system of the character described, a plurality of television cameras all focused differently, a plurality of lights each arranged to produce a different lighting effect on scenes being televised, a television transmitter, selective non-sequentially operated switching means connecting the video output of a selected one of said television cameras to said transmitter to modulate the same in accordance therewith, means operated upon operation of said selected switching means to energize different means of said plurality of lights corresponding to the video output of the camera selected, said last-mentioned means including switching means positioned in accordance with the focused condition of the camera selected, sound utilization means, a plurality of sound sources, each corresponding to a corresponding camera, and means operated by said selective non-sequentially operated switching means to connect different ones of said sound sources to said utilization means, said utilization means comprising a modulator stage of said transmitter.

6. The arrangement claimed in claim 1 characterized by the fact that said means to energize different ones of said lights serves to momentarily and simultaneously energize a plurality of different ones of said lights to effect a smooth transition in lighting when said selective switching means is operated.

References Cited in the file of this patent

UNITED STATES PATENTS

| | | |
|---|---|---|
| 1,570,004 | Reed | Jan. 19, 1926 |
| 1,889,840 | Owens | Dec. 6, 1932 |
| 1,950,091 | Owens | Mar. 6, 1934 |
| 1,998,644 | Tolson | Apr. 23, 1935 |
| 2,083,385 | Maxfield | June 8, 1937 |
| 2,164,770 | Gregory | July 4, 1939 |
| 2,239,379 | Bucky | Apr. 22, 1941 |
| 2,244,687 | Goldsmith et al. | June 10, 1941 |
| 2,244,688 | Goldsmith et al. | June 10, 1941 |
| 2,269,862 | Rose | Jan. 13, 1942 |
| 2,320,434 | Holcomb | June 1, 1943 |
| 2,381,901 | Goldsmith | Aug. 14, 1945 |
| 2,406,152 | Levine | Aug. 20, 1946 |
| 2,408,528 | Nassour | Oct. 1, 1946 |
| 2,649,016 | Fairbanks | Aug. 18, 1953 |

FOREIGN PATENTS

| | | |
|---|---|---|
| 610,146 | Germany | Mar. 4, 1935 |

OTHER REFERENCES

"Handling Lighting Equipment in Production" (Graves), J. S. M. P. E., vol. 29, pages 360–362, October 1937.

"Journal of the Society of Motion Picture Engineers," vol. 33, pages 41–53, July 1939, article by William C. Eddy entitled "Television Lighting."

"Remote Control Television Lighting" (Eddy), J. S. M. P. E., vol. 35, pages 268–280, September 1940.